United States Patent [19]

Galaj et al.

[11] Patent Number: 5,059,366
[45] Date of Patent: Oct. 22, 1991

[54] METHOD OF MAKING A MEMBRANE FILTER

[75] Inventors: Stanislas Galaj, Arcueil; Marie-Paule Besland, Saintonge; Alain Wicker, Paris; Jacques Gillot, LaLoubere; Raymond Soria, Bazet, all of France

[73] Assignee: Societe Des Ceramiques Techniques, Bazet, France

[21] Appl. No.: 520,015

[22] Filed: May 7, 1990

Related U.S. Application Data

[60] Division of Ser. No. 436,956, Nov. 15, 1989, Pat. No. 4,946,592, which is a continuation of Ser. No. 179,364, Apr. 8, 1988, abandoned, which is a continuation-in-part of Ser. No. 101,927, Sep. 28, 1987, abandoned.

[30] Foreign Application Priority Data

Oct. 10, 1986 [FR] France .................. 86 14134

[51] Int. Cl.$^5$ ............... B29C 35/02; B29D 7/01; B29D 9/00; B01D 71/02
[52] U.S. Cl. .................. 264/44; 264/43; 264/45.1; 264/46.4; 210/490; 210/500.25; 210/500.26; 210/510.1; 427/245; 427/247
[58] Field of Search ............ 264/43, 44, 45.1, 48, 264/46.4; 210/321.84, 490, 496, 500.25, 500.26, 510.1; 427/245, 246, 247

[56] References Cited

U.S. PATENT DOCUMENTS

| Re. 32,603 | 2/1988 | Brockmeyer | 210/510.1 |
|---|---|---|---|
| 3,022,187 | 2/1962 | Eyraud | 210/500.25 |
| 3,751,271 | 8/1973 | Kimura | 210/510.1 |
| 4,085,048 | 4/1978 | Croset | 210/500.25 |
| 4,242,159 | 12/1980 | Klimmek | 210/490 |
| 4,278,544 | 7/1981 | Takashima | 210/510.1 |
| 4,473,476 | 9/1984 | McMillan | 210/500.25 |
| 4,562,021 | 12/1985 | Alary | 264/43 |
| 4,619,767 | 10/1986 | Kamiyama | 210/490 |
| 4,679,150 | 8/1987 | Abe | 210/510.1 |
| 4,698,157 | 10/1987 | Gillot | 210/510.1 |
| 4,711,719 | 12/1987 | Leenaar | 210/500.26 |
| 4,719,058 | 1/1988 | Komoda | 210/510.1 |
| 4,724,078 | 2/1988 | Aurio | 210/510.1 |
| 4,865,742 | 9/1989 | Falletti | 210/651 |

FOREIGN PATENT DOCUMENTS

| 1140003 | 1/1983 | Canada | 210/500.25 |
|---|---|---|---|
| 135069 | 3/1985 | European Pat. Off. | 210/500.25 |
| 51-76188 | 7/1976 | Japan | 210/500.25 |
| WO85/00758 | 2/1985 | World Int. Prop. O. | 210/500.25 |

Primary Examiner—Ernest G. Therkorn
Attorney, Agent, or Firm—Sughrue, Minn, Zinn, Macpeak & Seas

[57] ABSTRACT

The fiter membrane comprises a porous structure made of a material selected from sintered ceramics, sintered metals, microporous carbon, and microporous glass, and is characterized by the fact that its entire external surface, including the inside surface of the pores in the structure, is covered with a thin and continuous film of carbon or of an oxide. In a sintered aluminum membrane, the surfaces of pores are coated with a dense and continuous thin layer of zirconia which prevents the surfaces from being degraded in service. In the figure, curve 3 shows how the throughput of a membrane without a zirconia layer falls off over time, while curve 4 shows little change in the same membrane having such a layer.

10 Claims, 1 Drawing Sheet

METHOD OF MAKING A MEMBRANE FILTER

This is a divisional of application Ser. No. 07/436,956 filed Nov. 15, 1989, now U.S. Pat. No. 4,946,592 which is a continuation of application Ser. No. 07/179,364 filed Apr. 8, 1988, now abandoned, which is a continuation-in-part of application Ser. No. 07/101,927 filed Sept. 28, 1987, now abandoned.

REFERENCE TO RELATED APPLICATIONS

This invention relates to application Ser. No. 179,365, filed Apr. 8, 1988 to Florence Falletti and entitled "A METHOD OF TREATING POLLUTED OIL-IN-WATER EMULSIONS OF MICROEMULSIONS" and assigned to the common corporate assignee, now U.S. Pat. No. 4,865,742.

Cheap and effective filter membranes are known comprising a porous structure made of a material selected from: sintered ceramics, sintered metals, microporous carbon, and microporous glass. The term "microporous glass" designates either a body obtained by heating a stack of calibrated glass particles, or else a body obtained by melting a mixture of oxides, then segregating said mixture into two phases, and preferentially dissolving one of the two phases by chemical attack, as, for example, when manufacturing VYCOR glass as described in the book CHEMISTRY OF GLASS published by The American Ceramic Society—1985, pages 108 to 114.

When using a sintered ceramic, filter membranes are frequently constituted mainly or exclusively by grains of sintered alumina.

The term "filter membrane" designates a porous structure having a surface layer with pores of well-defined diameter determining the separation power of the membrane. Such a membrane is frequently formed on a macroporous support using one or more superposed microporous layers.

Such a membrane is frequently formed on a support layer having larger pores and which may be constituted, for example, by grains of sintered alumina either with or without the aid of a vitreous phase, in particular using silicates. It has been observed that the surface activity of these membranes is modified during the course of filter cycles. In particular, reactions with the suspension to be filtered and a reduction in operating throughput have been observed, and this applies particularly to cases where the solution or the suspension to be filtered includes proteins or phosphate type groups, or other macromolecules having numerous reactive groups. This applies particularly to suspensions containing casein, and to alcoholic fermentation liquors for wine, cider, beer, etc.

For a membrane comprising several superposed layers, it is generally the surface layer which has the smallest diameter pores and which thus performs the filter function.

It has been observed that the performance in operation of such membranes depends not only on the pore diameter of the surface layer, but also on chemical and physico-chemical interactions between the surfaces of the pores and the fluids to be filtered. It is therefore essential to match the nature of the surface with the fluid under consideration.

In the past it has been the practice either to make an assembly constituted by a macroporous support and one or more microporous layers in which the entire assembly is made of a material which is well-matched to the fluid, or else to make an assembly comprising a macroporous support made of any convenient material together with one or more layers made of a material which is well-adapted to the fluid.

This solution suffers from the major drawback of requiring a method of manufacturing a microporous layer constituted by a material which is well-adapted to each particular fluid. When ceramics, metal, and porous glasses obtained by particle agglomeration are used, this means that: powders need to be prepared having a grain size which is carefully controlled as a function of the desired pore diameter; a homogeneous suspension, i.e. in general a suspension which is well deflocculated, and having rheological characteristics which are well-adapted to deposition needs to be developed, as does a method of deposition; and an appropriate sintering temperature must be sought, which temperature will depend on the size of the particles to be bonded by sintering, i.e. on the pore diameter.

When using microporous glasses obtained by segregating a liquid and dissolving one of its phases, this requires the development of a composition which can be segregated to give a first phase whose composition matches the fluid and a second phase which is soluble, together with accurate control of the segregation process so as to obtain a porous structure having the desired pore diameter after the second phase has been dissolved.

One object of the present invention is to provide filter membranes which are well matched to each specific utilization in a manner which is simpler and cheaper.

A further aim of the present invention is to provide a membrane of this type cheaply, having good filter properties and retaining them in service longer than do prior art membranes with surfaces constituted by alumina, even if the solution or the suspension to be filtered contains groups of one of the types mentioned above.

More particularly, the invention seeks to provide a ceramic filter membrane whose porous structure, whose pore diameter and whose porosity are practically the same as those of prior art membranes based on sintered alumina, and whose surface activity is little changed after numerous filtering and washing cycles.

SUMMARY OF THE INVENTION

The present invention, in one aspect, provides a filter membrane comprising a porous structure made of a material selected from: sintered ceramics, sintered metals, microporous carbon, and microporous glass, the membrane being characterized by the fact that the entire external surface thereof, including the surface inside the pores in said structure, is covered with a thin and continuous film of carbon or of an oxide selected from:

$MgO$, $Al_2O_3$, $SiO_2$, $TiO_2$, $Cr_2O_3$, $MnO$, $Fe_2O_3$, $CoO$, $NiO$, $CuO$, $ZnO$, $Ga_2O_3$, $GeO_2$, $TlO_2$, $Nb_2O_5$, $MoO_3$, $RuO_2$, $PdO$, $CdO$, $SnO_2$, $La_2O_3$, $HfO_2$, $Ta_2O_5$, $WO_3$, $PbO_2$, $Ce_2O_3$, and $Bi_2O_3$, alone or in combination, and $B_2O_3$, $BaO$ and $CaO$ mixed together with at least one of the above-specified oxides.

When said structure is constituted in conventional manner by grains which are fixed to one another by "bonded" portions of their surfaces leaving pores therebetween delimited by the remaining "exposed" portions of their surfaces, only said exposed portions of the grain surfaces are covered with said thin film which runs continuously from one grain to the next.

The mechanical strength of the porous structure is therefore not in danger of being degraded by the presence of the film.

Further, if the corrosion resistance of the film with respect to the fluids to be filtered or the fluids used for washing the membrane is better than the corrosion resistance of said structure, then the film acts as a protective film therefor.

The thickness of said film preferably lies between 2 nanometers (nm) and 1000 nm. This allows the protective film to be both thick enough to provide its isolation function while simultaneously being thin enough for temperature variations to give rise to stress at relatively low levels which do not lead to cracking and deterioration.

The invention is advantageously applied when the average pore diameter of the layer of the structure having the smallest diameter pores, i.e. the pores in the surface layer if there are several layers, lies between about 0.02 microns and 15 microns.

The thickness of said film preferably lies between 0.01% and 10% of the average pore diameter in the layer of the membrane having the smallest diameter pores. The porosity of the membrane is then substantially that of its initial porous structure.

The present invention also provides a method of manufacturing such a filter membrane, said method comprising a step of manufacturing a porous structure as defined above, said method being characterized by the fact that it includes a step of forming on said structure a thin and continuous film of carbon or of an oxide selected from:

$MgO$, $Al_2O_3$, $SiO_2$, $TiO_2$, $Cr_2O_3$, $MnO$, $Fe_2O_3$, $CoO$, $NiO$, $CuO$, $ZnO$, $Ga_2O_3$, $GeO_2$, $TlO_2$, $Nb_2O_5$, $MoO_3$, $RuO_2$, $PdO$, $CdO$, $SnO_2$, $La_2O_3$, $HfO_2$, $Ta_2O_5$, $WO_3$, $PbO_2$, $Ce_2O_3$, and $Bi_2O_3$, alone or in combination, and $B_2O_3$, $BaO$ and $CaO$ mixed together with at least one of the above-specified oxides.

Naturally the film may be made by any method which is suitable for depositing a thin layer in the mass of a porous body. Known methods includes coating, vapor phase deposition, soaking, etc.

However, it is preferable for said step of forming said film to comprise stages specified below.

When the film is a carbon film made by carbonizing an organic material, the stages are as follows:
preparing a solution containing:
an organic material selected for leaving a carbon-containing residue when heated in a non-oxidizing atmosphere, specific mention may be made, for example, of coal pitch, phenolic polymers, and furfurylic polymers; and
a solvent for said organic material;
impregnating said porous structure with said solution in such a manner as to cause all of the pores of said structure to be filled with said solution; and
heating said impregnated structure progressively up to about 800° C. to 1500° C. in a non-oxidizing atmosphere in order to evaporate the solvent and then decompose said organic material into a fraction which is removed in the form of gas and a carbon-containing residue which remains in the form of a continuous film.

When the film is a carbon film made by vapor phase deposition, said structure is maintained in a non-oxidizing atmosphere including a hydrocarbon gas at low pressure ($<10^{-1}$ bar) and at high temperature (1000° C. to 1500° C.), so that said hydrocarbon decomposes on coming into contact with the surface of said structure and deposits a thin film of pyrolytic carbon thereon.

When the film material is an oxide or a mixture of oxides, the stages are as follows:
preparing a solution containing:
one or more organic precursors of the alcoholate or the acetylacetonate type corresponding to the selected oxide or oxides;
a plasticizer, cross-linking agent of the triethyleneglycol or triethanolamine type; and
a solvent constituted by an alcohol;
impregnating said porous structure with said solution so that the pores in said structure are filled with said solution; and
progressively baking said impregnated structure so as to eliminate all of the components of said solution other than the oxide(s) formed from said precursor(s).

Such solution preferably contains 1% to 10% by mass oxide equivalent, 5% to 20% by mass plasticizer, and the remainder being alcohol. The alcohol solvent is preferably the alcohol of the alcoholate, or isopropanol if acetylacetonate is used.

Also preferably, said progressive baking stage itself comprises the following steps:
drying in ambient air at substantially ambient temperature;
slowly raising the temperature to about 350° C., with the rate of temperature rise being less than 5° C. per minute, at least over those temperature ranges in which gas is given off because of evaporation or decomposition of the organic materials in the solution;
rising to a baking temperature for at least about 10 minutes; and
cooling.

The major advantages of the method compared with making a microporous layer which is entirely constituted by the material which is matched to the fluid to be filtered, are as follows:

A wide variety of membrane surface types may be obtained using a single composition for the porous structure with only the pore diameter of said structure being modified, and by changing the composition of the film. It is much easier to change the nature of the surface by changing the starting substances used for forming the film than it is to modify said nature by developing on each occasion a microporous layer with the appropriate pore diameter and constituted by the appropriate mixture of oxides.

When using the above-mentioned preferred method, the composition of the film can be modified simply by changing the nature of the organic precursor or by mixing organic precursors of different metals.

The method of the invention enables said film to be obtained while using baking temperatures which are generally considerably less than the temperatures which would be required for sintering prior art microporous layers.

This is particularly advantageous for obtaining membranes in which the pore diameter of the filter layer is relatively large, e.g. 2 microns to 15 microns, for which sintering temperatures may be as high as 1800° C.

A second aspect of the present invention provides a filter membrane which is mainly or exclusively constituted by grains of sintered alumina, the membrane being characterized by the fact that the alumina is covered in a thin and continuous layer of zirconia. In some cases, this layer may advantageously be stabilized, in particular by adding yttrium oxide $Y_2O_3$ at a molar concentration of not more than 11° relative to the zirconia.

Zirconia is chemically more inert than alumina relative to most substances to be filtered at it constitutes a layer which isolates the substance to be filtered from the underlying alumina.

Preferably, the structure of the membrane is constituted in known manner by grains of alumina which are fixed to one another by "bonded" portions of the grain surfaces while leaving pores therebetween which are delimited by the remaining "exposed" portions of the grain surfaces.

This membrane is then more particularly characterized by the fact that only said exposed portions of the grain surfaces are covered in a thin layer of zirconia, said layer being continuous from one grain to another.

There is then no danger of the mechanical strength of the structure being reduced by the presence of the zirconia.

Preferably, the thickness of said layer of zirconia lies between 10 nanometers and 1000 nanometers. This ensures firstly that the protective layer is thick enough to provide its function of isolation, and secondly that the layer is flexible enough to be able to follow small deformations of the grains of alumina without breaking, in particular during variations in temperature.

The invention is advantageously applicable to cases where the average pore diameter of the layer having the smallest pores, i.e., the pores of the membrane, lies between about 0.1 microns and 10 microns. These smallest pores are the pores of the layer which provides filtering, which layer may be supported by another layer having larger pores and providing the mechanical strength of the assembly.

Preferably, the thickness of said layer of zirconia lies between 0.1% and 10% of the average diameter of the membrane pores. The porosity of the membrane is then substantially the same as the porosity of its porous alumina structure.

The present invention also provides a method of manufacturing such a filter membrane, said method including a step of manufacturing a membrane structure which is mainly or exclusively constituted by grains of alumina which are fixed to one another and which leave pores therebetween, said method being characterized by the fact that it then includes a step of forming a thin and continuous layer of zirconia on the surface of the alumina.

In order to make this layer of zirconia, any appropriate method of depositing a thin layer in the bulk of a porous body may naturally be used. These known methods include coating, vapor phase deposition, soaking, ...

Preferably, however, said step of forming a layer of zirconia itself comprises the following steps:
making a zirconiferous solution comprising:
an alcoholate of zirconium;
a plasticizer or cross-linking agent for the film of zirconia, such as triethylene-glycol, with the weight of the plasticizer lying between 5% and 100% of the weight of the zirconium alcoholate; and
a solvent constituted by an alcohol, preferably the source of alcohol of the zirconium alcoholate, with the weight of said solvent lying between three times and twenty times the weight of the zirconium alcoholate;

impregnating said alumina membrane structure and its optional macroporous support with said zirconiferous solution in such a manner as to cause the pores of said structure to be filled with said solution; and
progressively baking said impregnated structure so as to remove all the components of said zirconiferous solution except for the zirconia which is formed from the zirconium alcoholate.

Preferably said alcohol of said alcoholate and said solvent is n-butanol, in which case said alcoholate is zirconium n-butylate.

Also preferably, said progressive baking step itself comprises the following steps:
drying at substantially ambient temperature in ambient air;
slowly raising the temperature up to about 350° C. with the rate of rise being less than 5° Celsius per minute at least during those temperature ranges where gases are evolved due to evaporation or decomposition of the organic materials in the zirconiferous solution;
raising the temperature to a baking temperature lying between 350° C. and 1200° C.;
maintaining the baking temperature for at least about ten minutes; and
cooling.

BRIEF DESCRIPTION OF THE DRAWING

An implementation of the present invention lying within the scope given above is described in greater detail below by way of non-limiting example and with reference to the accompanying diagrammatic figures.

Figure 1:
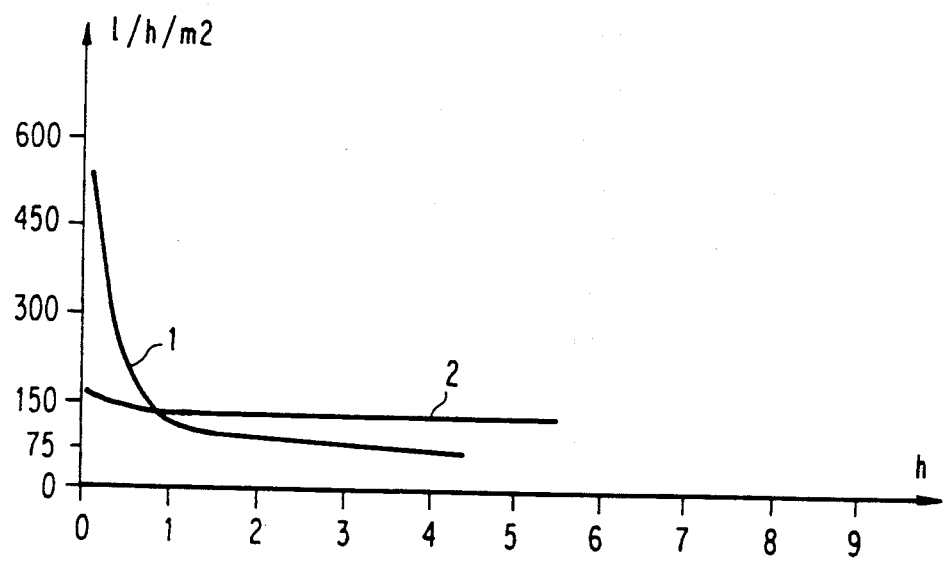
FIG. 1 is a graph with two curves showing variation in throughput for a prior membrane and for a first filter membrane in accordance with the invention, both being used in a conventional type of tangential flow filter apparatus, with throughput being plotted up the y-axis in liters per hour and per square meter of membrane and with time being plotted in hours along the x-axis.

Other characteristics and advantages of the present invention appears from the following description of embodiments of membranes in accordance with the invention together with the methods of manufacturing them, said embodiments being given purely by way of non-limiting example.

DESCRIPTION OF THE PREFERRED EMBODIMENTS

The starting material is a porous alumina structure constituted by a macroporous support whose pore diameter is about 15 microns having a microporous layer of sintered alumina fixed thereon by sintering, with the pore diameter in the microporous layer being about 0.2 microns and with the thickness of the layer being about 40 microns.

A thin film of titanium oxide is to be made on said structure. To do this, a coating solution is prepared comprising 36 grams (g) of titanium tetraisopropoxide (Ti[OiPr]$_4$), 20 g of triethanolamine (N[CH$_2$CH$_{OH}$3) and 70 g of isopropylic alcohol.

The tube of alumina is slowly immersed in said solution. After a few seconds, the tube is removed and is subjected to drying for several hours in ambient air. The tube is then baked using the following heating cycle: slow temperature rise (0.5° C./min) up to 100° C.; a pause of 20 min; followed by a rise to 700° C. at 1°

C./min to 3° C./min. The temperature is then maintained for 40 min, and cooling is performed by switching off the power supply to the oven.

For the other above-mentioned oxides, the procedure is the same as for titanium oxide, and the various components of the coating solution are indicated together with the proportions thereof in Table I. The following abbreviations are used.

| TEA | triethanolamine |
|---|---|
| TEG | triethylene glycol |
| Acac | acetylacetonate or pentanedionate |
| EtOH | ethanol |
| iPrOH | isopropanol |
| tPeOH | tertiopentanol |
| OtPe | tertiopentanolate |
| EtO | ethanolate |
| OEt | ethanolate |
| OiPr | isopropoxide |

There follows an example when the film material is constituted by two oxides: CuO and $TiO_2$.

The solution used then contains:

| 8 g | $Cu(OEt)_2$ |
|---|---|
| 11 g | $Ti(OEt)_4$ |
| 78 g | EtOH |
| 14 g | TEG |

The method then continues using the steps described above.

In the following example, the film material is a glass comprising five oxides: $SiO_2$, $B_2O_3$, $Al_2O_3$, CaO, BaO; three of these oxides: $B_2O_3$, CaO, and BaO, do not appear in Table I since they are incapable of producing a worthwhile film on their own.

The steps of the method are the same as before, and the initial solution comprises:

| precursor: | 19.3 g | $Si(OEt)_4$ |
|---|---|---|
| | 1.1 g | $B(OEt)_4$ |
| | 7.3 g | $AlAcac_3$ |
| | 5.5 g | $CaAcac_2$ |
| | 0.7 g | $BaAcac_2$ |
| alcohol: | 70 g | EtOH |
| plasticizer: | 20 g | TEA |

Two examples of making a carbon film are described below.

In the first example, an organic material is carbonized. To do this, a 5% solution of coal pitch is prepared in toluene, the porous structure is soaked in said solution so as to be completely impregnated, it is drained and heated slowly in a non-oxidizing atmosphere, initially up to about 100° C. in order to evaporate the toluene, and then up to 1000° C. in order to carbonize the film of coal pitch which remains on the surface of the porous structure. This provides carbon film having a thickness of about 1% of the pore diameter.

The second example uses vapor phase deposition. The porous structure is placed in an enclosure which is evaporated and heated up to 1200° C. A mixture containing 10% methane and 90% argon is then inserted into the enclosure up to a total pressure of 100 millibars. The methane then decomposes on coming into contact with the surface of the porous structure and forms a thin and continuous film thereon of pyrolytic carbon whose thickness increases progressively. The treatment is stopped when said thickness reaches the desired value, for example 0.1 um; the duration of the treatment is about one hour and depends on the shape and the structure of the sample and on the type of the enclosure.

Naturally, the invention is not limited to the various methods of preparation mentioned above.

In a further embodiment, the starting filter tube is constituted by a macroporous alumina support (pore diameter = 15 microns) having a 40-micron thick macroporous (pore diameter about 0.2 microns) membrane (likewise of alumina) fixed thereto by sintering.

An n-butanol solution is made comprising 105 g/l (grams per liter) of butanol/zirconium n-butylate complex ($Zr(OBu)_4$, BuOH) and 70 g/l of triethyleneglycol. The alumina tube is slowly immersed in said solution. After a few seconds, the tube is withdrawn and it is subjected to drying in ambient air for several hours. The tube is then baked in accordance with the following temperature cycle: slow temperature rise up to 350° C. (1.5° C./min), then rise to 750° C. at a rate of 2° C./min to 3° C./min. The temperature is then maintained for 30 min and cooling is then obtained by switching off the power supply to the oven.

The thickness of the resulting film of zirconia varies between 5% and 10% of the average diameter of the pores in the layer having the smallest pores, i.e. 10 nm to 20 nm (this applies to a soaking operation).

In comparison with a prior art membrane constituted by the starting filter tube, and under identical filter conditions, a very clear improvement in filter performance is observed when filtering wine, as can be seen in FIG. 1. Curve 1 represents the prior art membrane and curve 2 represents the membrane in accordance with the invention.

In yet a further embodiment, the starting filter tube is made of alumina and has pores which are 5 microns in diameter. An n-butanol solution is made comprising 115 g/l of butanol/zirconium n-butylate complex ($Zr(OBu)_4$, BuOH), 60 g/l of triethylene-glycol, and 15 g/l of anhydrous yttrium nitrate. After immersing the tube as above, it is subjected to heat treatment: a slow rise up to 350° C. (at 1.5° C./min) followed by a rise to 1000° C. (at a rate of 2° C./min to 3° C./min), pause at this temperature for 30 min followed by natural cooling.

The thickness of the yttrified zirconia film is less than 1% of the pore diameter, i.e. 50 nm (this applies to a soaking operation).

Figure 2:
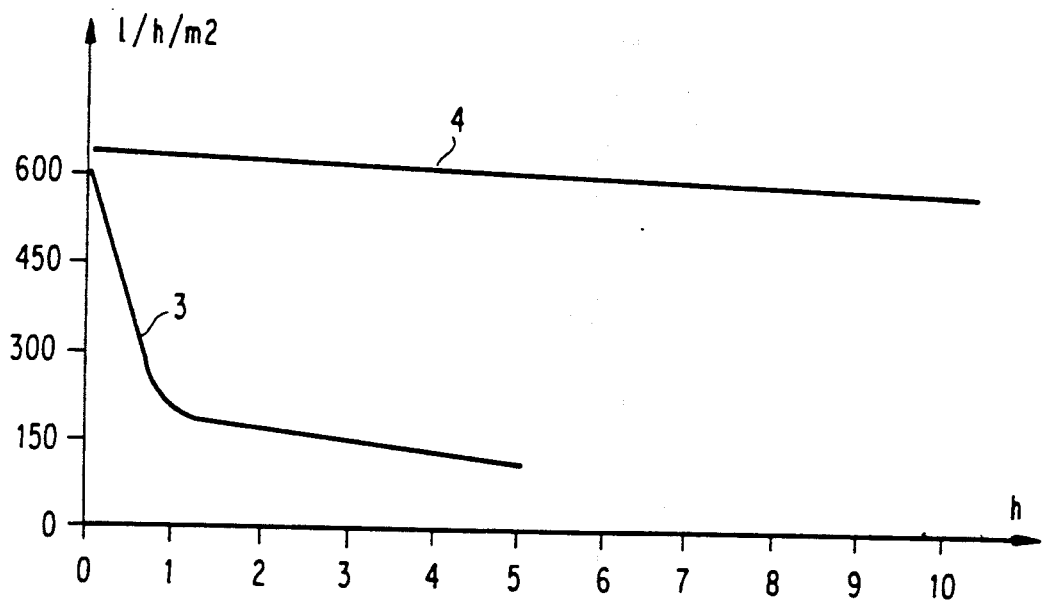
FIG. 2 shows similar curves for another prior art membrane and for a second membrane in accordance with the invention.

In comparison with a prior art membrane constituted by the starting tube, a very large improvement in performance is observed when filtering fermented molasses liquor (see FIG. 2 in which curve 3 represents the prior art membrane and curve 4 represents the membrane in accordance with the invention).

The present invention with respect to the last two embodiments described above has the following advantages in particular:

all of the layers of the filter element are coated and not only the surface layer which constitutes the membrane;

the geometrical structure of the porous medium is not altered;

it is applicable to different pore sizes and to filter elements of diverse shapes (tube, plane, multi-channel);

good performance in the face of temperature variation by virtue of the thinness of the film; and improved filter performance.

It may also be observed that a membrane in accordance with the invention provides substantially the same performance as would be provided by a membrane made solely of zirconia (stabilized or not). However, a zirconia membrane would be much more expensive to obtain because of the temperatures and sintering time required and also because of the cost of the raw materials.

TABLE I

| OXIDE | PRECURSOR | ALCOHOL | PLASTICIZER |
|---|---|---|---|
| MgO | 12 g Mg(OEt)4 | 88 g EtOH | 8 g TEA |
| Al2O3 | 44.5 g AlAcac3 | 86 g iPrOH | 7 g TEG |
| SiO2 | 4 g Si(OEt)4 | 94 g EtOH | 5 g TEA |
| Cr2O3 | 27.6 g CrAcac3 | 86 g iPrOH | 8 g TEG |
| MnO | 14.3 g MnAcac2 | 90 g iPrOH | 6 g TEG |
| Fe2O3 | 35.3 g FeAcac3 | 80 g iPrOH | 12 g TEA |
| CoO | 32.8 g CoAcac3 | 83 g iPrOH | 10 g TEA |
| NiO | 31 g NiAcac 2H2O | 82 g iPrOH | 10 g TEG |
| CuO | 19.8 g CuAcac2 | 85 g iPrOH | 9 g TEA |
| ZnO | 13 g ZnAcac2 | 84 g iPrOH | 12 g TEA |
| Ga2O3 | 19.6 g GaAcac3 | 80 g iPrOH | 15 g TEG |
| GeO2 | 10 g Ge(EtO)4 | 89 g EtOH | 7 g TEA |
| TlO2 | 7.4 g Tl(OEt) | 75 g EtOH | 18 g TEG |
| Nb2O5 | 14 g Nb(OEt)5 | 79 g EtOH | 15 g TEG |
| MoO3 | 14.3 g MoO2Acac2 | 79 g iPrOH | 13 g TEG |
| RuO2 | 30 g RuAcac3 | 75 g iPrOH | 15 g TEA |
| PdO | 12.5 g PdAcac2 | 87 g iPrOH | 8 g TEA |
| CdO | 12 g CdAcac2 | 87 g iPrOH | 10 g TEA |
| SnO2 | 13.8 g SnAcac3 | 88 g iPrOH | 7 g TEG |
| La2O3 | 24 g LaAcac3 | 79 g iPrOH | 12 g TEG |
| HfO2 | 17.5 g Hf(OtPe) 4 | 78 g tPeOH | 15 g TEA |
| Ta2O5 | 14.8 g Ta(OEt)5 | 79 g EtOH | 13 g TEA |
| WO3 | 10 g WAcac3 | 83 g iPrOH | 12 g TEA |
| PbO2 | 5 g PbAcac2 | 91 g iPrOH | 6 g TEG |
| Ce2O3 | 13 g CeAcac3 | 83 g iPrOH | 12 g TEA |
| Bi2O3 | 15 g BiAcac3 | 79 g iPrOH | 14 g TEA |

What is claimed is:

1. A method of manufacturing a membrane comprising forming a porous structure made of a material selected from sintered ceramics and sintered metals, and forming on said structure grains which are fixed one to another by bonded portions of their surfaces leaving pores therebetween delimited by the remaining exposed portions of the surfaces of the said grains, wherein the entire exposed portions of the surfaces of the grains including the surface inside the pores of the porous structure are covered with a thin and continuous film of an oxide selected from the group consisting of $ZrO_2$, MgO, $Al_2O_3$, $SiO_2$, $TiO_2$, $Cr_2O_3$, MnO, $Fe_2O_3$, CoO, NiO, CuO, ZnO, $Ga_2O_3$, $GeO_2$, $TlO_2$, $Nb_2O_5$, $MoO_3$, $RuO_2$, PdO, CdO, $SnO_2$, $La_2O_3$, $HfO_2$, $Ta_2O_5$, $WO_3$, $PbO_2$, $Ce_2O_3$, and $Bi_2O_3$, alone or in combination, or in mixture with $B_2O_3$, BaO, or CaO, wherein the thickness of said film lies between 2 nm and 1000 nm, wherein the average pore diameter of the surface layer of said structure lies between 0.02 microns and 15 microns, the porosity of the membrane being then substantially that of the initial porous structure.

2. A method of manufacturing a membrane according to claim 1, wherein said step of making a film based on at least one oxide comprises the following stages:
making a solution containing:
one or more organic precursors of the alcoholate or the acetylacetonate type corresponding to the selected oxide(s);
a plasticizer, cross-linking agent selected from tri-ethanolamine and triethylene glycol; and
a solvent constituted by at least one alcohol; impregnating said structure with said solution in such a manner as to cause its pores to be filled with said solution; and
progressively baking said impregnated structure in such a manner as to eliminate all of the components of said solution other than the oxide(s) formed from the precursor(s).

3. A method according to claim 2, wherein said solution contains 1% to 10% by mass of oxide equivalent, 5% to 20% by mass of plasticizer, and the remainder being alcohol.

4. A method according to claim 2, wherein said progressive baking stage itself comprises the following steps:
drying in ambient air at ambient temperature;
slowly raising the temperature to about 350° C. with the rate of rise being less than 5° C. per minute, at least during those temperature ranges in which gas is given off because of evaporation or decomposition of the organic materials of the solution;
rising to a baking temperature lying between 350° C. and 1200° C.;
maintaining the baking temperature for at least about ten minutes; and
cooling.

5. A method of manufacturing a filter membrane according to claim 1, said method including a step of manufacturing a membrane structure which is at least mainly constituted by grains of alumina which are fixed to one another and which leave pores therebetween, said method then including a step of forming a thin and continuous layer of zirconia on the surface of the alumina.

6. A method according to claim 5, wherein said step of forming a layer of zirconia itself comprises the following steps:
making a zirconiferous solution containing:
an alcoholate of zirconium;
a plasticizer or cross-linking agent for the film of zirconia, such as triethylene-glycol, with the weight of the plasticizer lying between 5% and 100% of the weight of the zirconium alcoholate; and
a solvent constituted by an alcohol with the weight of said solvent lying between three times and twenty times the weight of the zirconium alcoholate;
impregnating said aluminum membrane structure and its optional macroporous support with said zirconiferous solution in such a manner as to cause the pores of said structure to be filled with said solution; and
progressively baking said impregnated structure so as to remove all the components of said zirconiferous solution except for the zirconia which is formed from the zirconium alcoholate.

7. A method according to claim 6, wherein said solvent is the source of alcohol of said zirconium alcoholate.

8. A method according to claim 7, wherein said alcohol of said alcoholate is n-butanol, said alcoholate being zirconium n-butylate.

9. A method according to claim 6, wherein said plasticizer is triethylene-glycol.

10. A method according to claim 6, wherein said progressive baking step itself comprises the following steps:
drying at substantially ambient temperature;
slowly raising the temperature up to about 350° C. with the rate of rise being less than 5° Celsius per minute at least during those temperature ranges where gases are evolved due to evaporation or decomposition of the organic materials in the zirconiferous solution;

raising the temperature to a baking temperature lying between 350° C. and 1200° C.;

maintaining the baking temperature for at least about ten minutes; and cooling.

* * * * *